United States Patent
Park

(10) Patent No.: US 11,205,905 B2
(45) Date of Patent: Dec. 21, 2021

(54) BATTERY MANAGEMENT APPARATUS, BATTERY MANAGEMENT METHOD, AND ENERGY STORAGE SYSTEM INCLUDING THE BATTERY MANAGEMENT APPARATUS

(71) Applicant: LG CHEM, LTD., Seoul (KR)

(72) Inventor: Mi-So Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 8 days.

(21) Appl. No.: 16/649,100

(22) PCT Filed: Feb. 11, 2019

(86) PCT No.: PCT/KR2019/001636
§ 371 (c)(1),
(2) Date: Mar. 19, 2020

(87) PCT Pub. No.: WO2019/212128
PCT Pub. Date: Nov. 7, 2019

(65) Prior Publication Data
US 2020/0227925 A1   Jul. 16, 2020

(30) Foreign Application Priority Data
May 3, 2018   (KR) ........................ 10-2018-0051134

(51) Int. Cl.
*H02J 7/00* (2006.01)

(52) U.S. Cl.
CPC .......... *H02J 7/0029* (2013.01); *H02J 7/0014* (2013.01)

(58) Field of Classification Search
CPC ...... H02J 9/02; H02J 7/34; H02J 9/065; H02J 7/0068; H02J 9/061; H02J 7/345;
(Continued)

(56) References Cited

U.S. PATENT DOCUMENTS

| 9,543,767 B2 | 1/2017 | Wada et al. |
| 2009/0039830 A1 | 2/2009 | Pellenc |

(Continued)

FOREIGN PATENT DOCUMENTS

| JP | 2009-33936 A | 2/2009 |
| JP | 2010-045923 A | 2/2010 |

(Continued)

OTHER PUBLICATIONS

Extended European Search Report dated Dec. 23, 2020, issued in corresponding European Patent Application No. 19796450.5.

(Continued)

*Primary Examiner* — Binh C Tat
(74) *Attorney, Agent, or Firm* — Morgan, Lewis & Bockius LLP

(57) ABSTRACT

Provided is a battery management apparatus, a battery management method and an energy storage system including the same. The battery management apparatus according to an embodiment of the present disclosure includes a first battery pack, a second battery pack, a first switch connected in series to the first battery pack between a first terminal and a second terminal, a second switch connected in series to the second battery pack between the first terminal and the second terminal, and a control unit. The control unit is configured to turn on both the first switch and the second switch when a voltage difference between the first battery pack and the second battery pack at a time point at which both the first switch and the second switch are turned off is less than a threshold voltage.

13 Claims, 7 Drawing Sheets

(58) Field of Classification Search
CPC .......... H02J 13/00006; H02J 13/00017; H02J 13/0017; H02J 3/381; H02J 3/383; H02J 2300/26; H02J 3/385; H02J 3/46; H02J 2300/30; H02J 2310/40; H02J 2310/44; H02J 2310/48; H02J 3/14; H02J 3/18; H02J 3/387; H02J 7/00036; H02J 7/00041; H02J 7/00047; H02J 13/00; H02J 13/00002; H02J 13/00009; H02J 13/00016; H02J 13/00022; H02J 13/00026; H02J 13/0062; H02J 13/0075; H02J 3/38; H02J 1/102; H02J 2300/24; H02J 50/10; H02J 7/0014; H02J 7/0029; H02J 7/342; H02J 7/35; H02J 7/00; H02J 7/0047; H02J 7/0027; H02J 7/0013; H02J 2300/28; H02J 2310/23; H02J 7/0042; H02J 2207/40; H02J 50/40; H02J 7/0045; H02J 7/0048; H02J 50/20; H02J 50/402; H02J 2007/0067; H02J 3/00; H02J 3/32; H02J 7/007; H02J 1/108; H02J 15/00; H02J 2207/20; H02J 2300/40; H02J 2310/22; H02J 3/386; H02J 50/005; H02J 50/12; H02J 50/70; H02J 50/80; H02J 50/90; H02J 7/0018; H02J 7/0019; H02J 7/0021; H02J 7/0025; H02J 7/0044; H02J 7/0063; H02J 7/008; H02J 7/025; H02J 7/045; H04B 17/309; H04B 17/12; H01Q 9/04; H01Q 3/01; H01Q 1/243; H01Q 3/40; H01Q 1/44; H05B 47/19; H05B 47/13; H05B 45/00; G01R 31/36; G01R 31/3835; G01R 21/133; H02M 1/007; H02M 3/1582; H02M 1/0077; H02M 1/36; H02M 3/156
USPC .................................................. 320/160–167
See application file for complete search history.

(56) References Cited

U.S. PATENT DOCUMENTS

| | | | |
|---|---|---|---|
| 2011/0127964 | A1 | 6/2011 | Nishida et al. |
| 2012/0104856 | A1 | 5/2012 | Gottlieb et al. |
| 2015/0016002 | A1 | 1/2015 | He et al. |
| 2015/0188334 | A1* | 7/2015 | Dao .................. H04Q 9/00 320/107 |
| 2015/0200559 | A1 | 7/2015 | Im |
| 2015/0364797 | A1 | 12/2015 | Inaba et al. |
| 2016/0226263 | A1 | 8/2016 | Seo et al. |
| 2016/0257202 | A1 | 9/2016 | Chatroux et al. |
| 2016/0261127 | A1* | 9/2016 | Worry ................ H01M 10/425 |
| 2016/0380448 | A1* | 12/2016 | Seo .................... H02J 7/0031 320/112 |
| 2017/0054134 | A1 | 2/2017 | Choi et al. |
| 2018/0047485 | A1 | 2/2018 | Golubovic |

FOREIGN PATENT DOCUMENTS

| | | |
|---|---|---|
| JP | 2010-148353 A | 7/2010 |
| JP | 2014-107969 A | 6/2014 |
| JP | 5965538 B2 | 8/2016 |
| KR | 10-2014-01065691 A | 9/2014 |
| KR | 10-2016-0023220 A | 3/2016 |
| KR | 10-2017-0035619 A | 3/2017 |
| KR | 10-1738622 B1 | 5/2017 |
| KR | 10-2017-0071949 A | 6/2017 |
| KR | 10-1742599 B1 | 6/2017 |
| WO | 2018/035093 A1 | 2/2018 |

OTHER PUBLICATIONS

International Search Report issued in corresponding International Patent Application No. PCT/KR2019/001636, dated May 20, 2019.
Office Action dated Apr. 19, 2021, issued in corresponding Japanese Patent Application No. 2020-514182.

* cited by examiner

BATTERY MANAGEMENT APPARATUS, BATTERY MANAGEMENT METHOD, AND ENERGY STORAGE SYSTEM INCLUDING THE BATTERY MANAGEMENT APPARATUS

TECHNICAL FIELD

The present disclosure relates to a battery management apparatus for a plurality of battery packs, a battery management method and an energy storage system including the battery management apparatus.

The present application claims priority to Korean Patent Application No. 10-2018-0051134 filed in the Republic of Korea on May 3, 2018, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries hare little or no memory effect, and thus they are gaining more attention than nickel-based batteries for their advantages of free charging and discharging, a very low self-discharge rate and high energy density.

A battery management apparatus may include a single battery pack, but to expand the charge/discharge capacity, additional battery pack(s) may be added. When the battery management apparatus includes a plurality of battery packs, the plurality of battery packs may be installed connectably in parallel. However, when connecting in parallel the plurality of battery packs included in the battery management apparatus, inrush current may flow due to a voltage difference between the plurality of battery packs. The inrush current may degrade the life of the battery packs, and cause severe physical damage to the battery packs and peripheral circuitry.

Meanwhile, the battery management apparatus may include a circuit breaker. The circuit breaker is a component that electrically separates each battery pack from an electrical load to protect each battery pack when a particular situation (for example, power outage, long-term nonuse, overcurrent) occurs in the battery management apparatus. However, once the lever of the circuit breaker is tripped to the OFF position, an operator has to push the lever to the ON position by hands, causing inconvenience.

Additionally, when a switch connected to each battery pack is suddenly turned off while the current flows through each battery pack, there is a risk that an arc may occur at the contact point of the switch, causing the switch to melt.

DISCLOSURE

Technical Problem

The present disclosure is designed to solve the above-described problem, and therefore the present disclosure is directed to providing a battery management apparatus, a battery management method and an energy storage system including the battery management apparatus for protecting a plurality of battery packs and peripheral circuitry from physical damage due to the inrush current when connecting the plurality of battery packs in parallel.

Additionally, the present disclosure is further directed to providing a battery management apparatus, a battery management method and an energy storage system including the battery management apparatus for electrically separating each battery pack from an electrical load safely without using a circuit breaker when a particular situation (for example, power outage, long-term nonuse, overcurrent) occurs.

These and other objects and advantages of the present disclosure may be understood by the following description and will be apparent from the embodiments of the present disclosure. Further, it will be readily understood that the objects and advantages of the present disclosure may be realized by the means set forth in the appended claims and combinations thereof.

Technical Solution

A battery management apparatus according to an aspect of the present disclosure is connectable to a power conversion system through a first terminal and a second terminal of the power conversion system. The battery management apparatus includes a first battery pack, a second battery pack, a first switch connected in series to the first battery pack between the first terminal and the second terminal, a second switch connected in series to the second battery pack between the first terminal and the second terminal, and a control unit operably coupled to the first switch and the second switch. The control unit is configured to perform balancing steps for parallel connection between the first battery pack and the second battery pack. The control unit is configured to determine whether a pack current of the first battery pack and a pack current of the second battery pack are within a preset current range in a shutdown preparation mode in response to a first notification signal from the power conversion system while any one of the balancing steps is performed. The control unit is configured to turn off the first switch and the second switch when the pack current of the first battery pack and the pack current of the second battery pack are determined to be within the preset current range.

The control unit is configured to execute the shutdown preparation mode at a time point at which a preset preparation period has passed from a time point at which the first notification signal was received by the control unit.

The preset preparation period may be equal to or longer than a tracking period of the power conversion system. The tracking period may indicate a minimum time required for the power conversion system to reduce power supplied between the first terminal and the second terminal down to 0 W.

The control unit may be configured to resume one of the balancing steps being performed at the time point at which the first notification signal was received, when a second notification signal from the power conversion system is received before the preset preparation period has passed from the time point at which the first notification signal was received.

The control unit may be configured to execute a current diagnosis mode for monitoring each of the pack current of the first battery pack and the pack current of the second battery pack for an indefinite time, when at least one of the pack current of the first battery pack and the pack current of the second battery pack at a time point at which the shutdown preparation mode was executed is determined to be outside of the preset current range.

The control unit may be configured to turn off the first switch and the second switch, when the pack current of the first battery pack and the pack current of the second battery pack are within the preset current range during execution of the current diagnosis mode.

The control unit may be configured to maintain the first switch and the second switch in a turn on state when a second notification signal from the power conversion system is received during execution of the current diagnosis mode, in case that the first switch and the second switch were already turned on at the time point at which the first notification signal was received by the control unit.

The first notification signal may indicate that power supply from an electrical grid electrically connected to the power conversion system was interrupted.

The second notification signal may indicate that power supply from the electrical grid is resumed.

An energy storage system according to another aspect of the present disclosure includes the battery management apparatus, and the power conversion system connectable to the battery management apparatus through the first terminal and the second terminal.

A battery management method according to still another aspect of the present disclosure is for protecting the battery management apparatus. The battery management method includes executing the shutdown preparation mode in response to the first notification signal from the power conversion system while any one of the balancing steps for parallel connection between the first battery pack and the second battery pack is performed, determining whether the pack current of the first battery pack and the pack current of the second battery pack are within the preset current range in the shutdown preparation mode, and turning off the first switch and the second switch when the pack current of the first battery pack and the pack current of the second battery pack are determined to be within the preset current range.

Advantageous Effects

According to at least one of the embodiments of the present disclosure, it is possible to protect a plurality of battery packs and peripheral circuitry from physical damage due to the inrush current when connecting the plurality of battery packs in parallel.

Additionally, according to at least one of the embodiments of the present disclosure, it is possible to electrically separate each battery pack from an electrical load safely without using a circuit breaker when a particular situation (for example, power outage, long-term nonuse, overcurrent) occurs.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
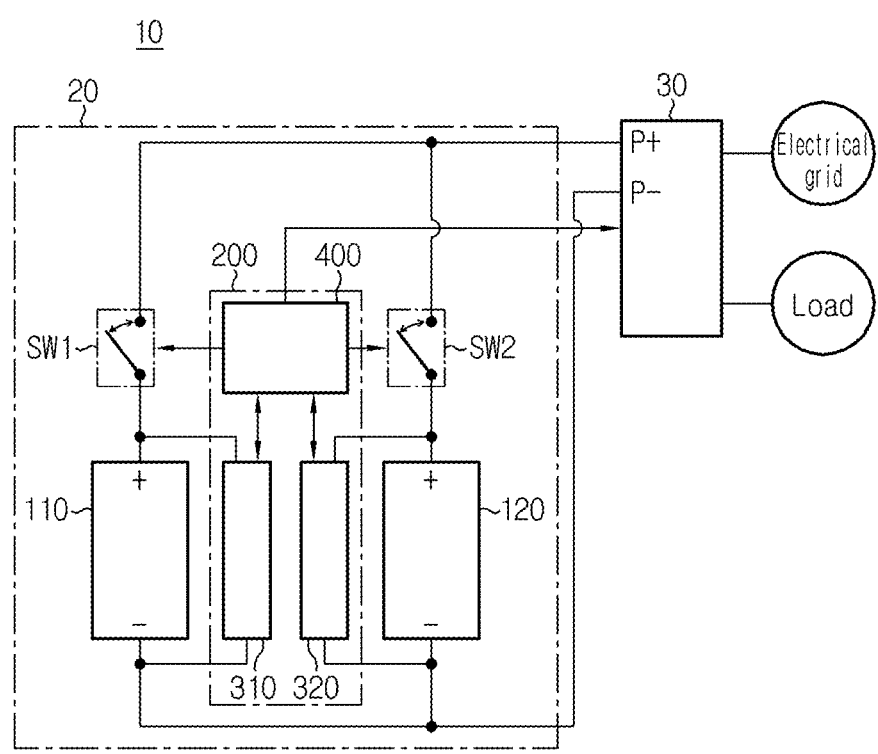
FIG. 1 is an exemplary diagram showing the configuration of an energy storage system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

FIG. 1 is an exemplary diagram showing the configuration of an energy storage system 30 according to an embodiment of the present disclosure.

Referring to FIG. 1, the energy storage system 10 includes a battery management apparatus 20 and a power conversion system 30. The battery management apparatus 20 is electrically connectable to the power conversion system 30 through a first terminal P+ and a second terminal P− of the power conversion system 30. The battery management apparatus 20 includes a first battery pack 110, a second battery pack 120, a first switch SW1, a second switch SW2 and a control unit 200.

The first battery pack 110 includes at least one battery cell. The second battery pack 120 includes at least one battery cell. Each battery cell included in the first battery pack 110 and the second battery pack 120 may be, for example, a rechargeable battery such as a lithium ion battery, a lithium polymer battery, a nickel cadmium battery, a nickel hydrogen battery or a nickel zinc battery. The first battery pack 110 and the second battery pack 120 may be manufactured with the same rated voltage, rated current and design capacity. However, the first battery pack 110 and the second battery pack 120 may be different in State Of Health (SOH) depending on the number of charge/discharge cycles of each of the first battery pack 110 and the second battery pack 120.

The first switch SW1 is connected in series to the first battery pack 110 between the first terminal P+ and the second terminal P−. For example, as shown in FIG. 1, one end of the first switch SW1 is connected to the positive terminal of the first battery pack 110, the other end of the first switch SW1 is connected to the first terminal P+, and the negative terminal of the first battery pack 110 is connected to the second terminal P−. When the first switch SW1 is turned on, the first battery pack 110 is electrically connected between the first terminal P+ and the second terminal P− through the first switch SW1. When the first switch SW1 is turned off, the first battery pack 110 is electrically separated from at least one of the first terminal P+ and the second terminal P−.

The second switch SW2 is connected in series to the second battery pack 120 between the first terminal P+ and the second terminal P−. For example, as shown in FIG. 1, one end of the second switch SW2 is connected to the positive terminal of the second battery pack 120, the other end of the second switch SW2 is connected to the first terminal P+, and the negative terminal of the second battery pack 120 is connected to the second terminal P−. When the second switch SW2 is turned on, the second battery pack 120 is electrically connected between the first terminal P+ and the second terminal P− through the second switch SW2. When the second switch SW2 is turned off, the second battery pack 120 is electrically separated from at least one of the first terminal P+ and the second terminal P−.

Each of the first switch SW1 and the second switch SW2 may be implemented using any one of known switching elements such as a relay or a Field Effect Transistor (FET) or a combination of two or more of them.

The control unit 200 is configured to monitor the state of the first battery pack 110 and the state of the second battery pack 120 respectively. The control unit 200 is configured to control the first switch SW1 and the second switch SW2 respectively. The control unit 200 may include a first slave controller 310, a second slave controller 320 and a master controller 400.

The first slave controller 310 is configured to periodically monitor the operational state of the first battery pack 110. The first slave controller 310 includes a voltage sensor, a current sensor and a processor. The voltage sensor of the first slave controller 310 is configured to measure the voltage across the first battery pack 110. The current sensor of the first slave controller 310 is configured to measure the pack current flowing through the first battery pack 110. The first slave controller 310 is configured to calculate the State Of Charge (SOC) of the first battery pack 110 based on at least one of the voltage and the current of the first battery pack 110. The first slave controller 310 is configured to periodically transmit first data indicating at least one of the voltage and the SOC of the first battery pack 110 to the master controller 400. To transmit the first data, the first slave controller 310 and the master controller 400 are connected to each other via a communication interface.

The second slave controller 320 is configured to periodically monitor the operational state of the second battery pack 120. The second slave controller 320 includes a voltage sensor, a current sensor and a processor. The voltage sensor of the second slave controller 320 is configured to measure the voltage across the second battery pack 120. The current sensor of the second slave controller 320 is configured to measure the pack current flowing through the second battery pack 120. The second slave controller 320 is configured to calculate the SOC of the second battery pack 120 based on at least one of the voltage and the current of the second battery pack 120. The second slave controller 320 is configured to periodically transmit second data indicating at least one of the voltage and the SOC of the second battery pack 120 to the master controller 400. To transmit the second data, the second slave controller 320 and the master controller 400 are connected to each other via a communication interface.

A variety of known algorithms may be used for the first and second slave controllers 310, 320 to calculate the SOC. For example, the SOC may be calculated based on the voltage and the pack current of each battery pack using ampere counting, an equivalent circuit model or a Kalman filter.

The master controller 400 is operably coupled to the first slave controller 310, the second slave controller 320, the first switch SW1, the second switch SW2 and the power conversion system 30. The master controller 400 is configured to calculate a voltage difference and an SOC difference between the first battery pack 110 and the second battery pack 120. Additionally, for parallel connection between the first battery pack 110 and the second battery pack 120, the master controller 400 may individually turn on or off the first switch SW1 and the second switch SW2 by executing software pre-stored in a memory device thereof. Additionally, to charge at least one of the first battery pack 110 and the second battery pack 120, the master controller 400 may command the power conversion system 30 to supply any one of a first constant power and a second constant power between the first terminal P+ and the second terminal P− or may command the power conversion system 30 to stop the supply.

Each of the first slave controller 310, the second slave controller 320 and the master controller 400 may physically include at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions.

The memory device may be embedded in the processor of at least one of the first slave controller 310, the second slave controller 320 and the master controller 400, and the memory device may include, for example RAM, ROM, register, hard disk, an optical recording medium or a magnetic recording medium. The memory device may store, update and/or erase programs including various control logics that are executed by at least one of the first slave controller 310, the second slave controller 320 and the master controller 400, and/or data created when the control logics are executed.

The power conversion system 30 is operably coupled to the control unit 200 via the communication interface. The communication interface may be implemented using known communication interfaces, for example, LAN, CANN, and local area wired or wireless communication network. The power conversion system 30 may be electrically connected to at least one of an electrical grid and an electrical load. The power conversion system 30 may convert power supplied from the system or the battery management apparatus 20 and supply it to the electrical load. In response to a command from the control unit 200, the power conversion system 30 is configured to generate a constant power of a magnitude corresponding to the command using the input power from the electrical grid, and selectively supply the generated constant power between the first terminal P+ and the second terminal P−. The power conversion system 30 may selectively transmit a first notification signal and a second notification signal to the control unit 200 while monitoring the situation (for example, power outage, power restoration) of the electrical grid.

Figure 2:
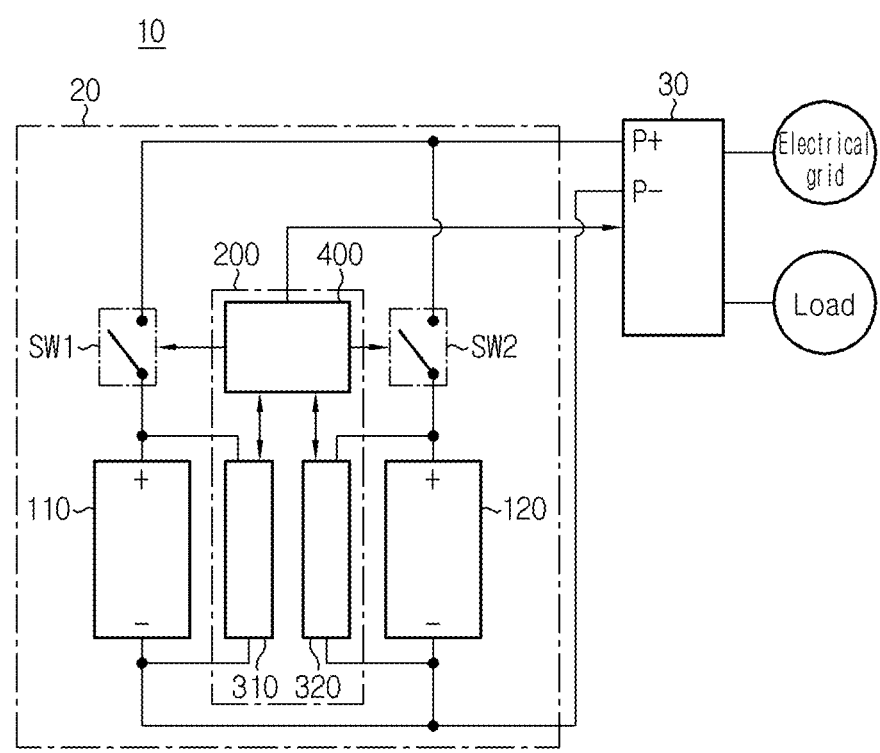
FIGS. 2 to 4 are diagrams for reference in describing operations that may be performed to connect a first battery pack and a second battery pack of FIG. 1 in parallel.
Figure 3:
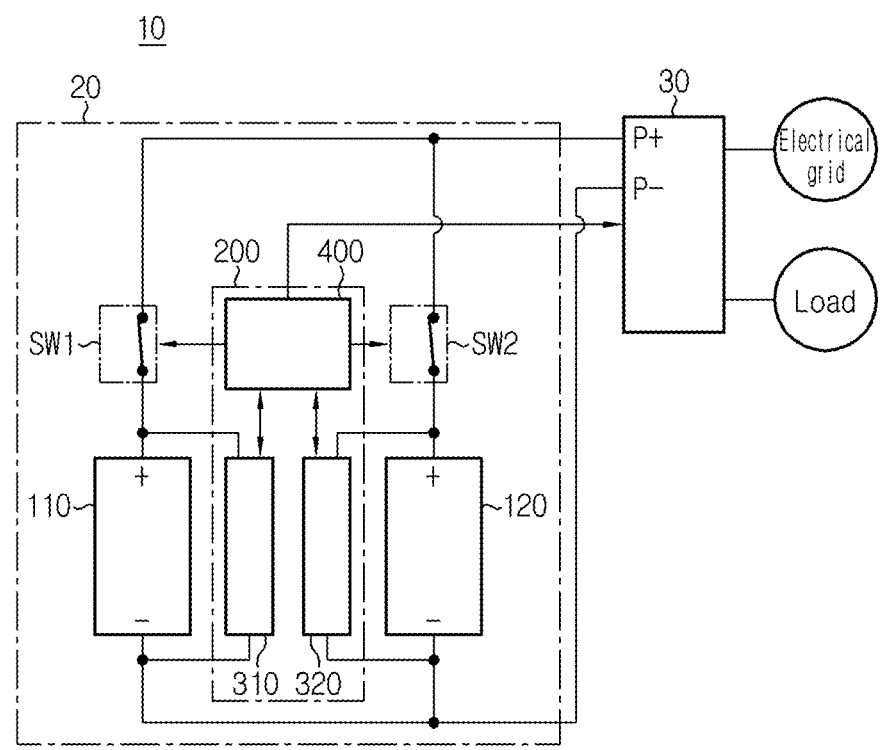
Figure 4:
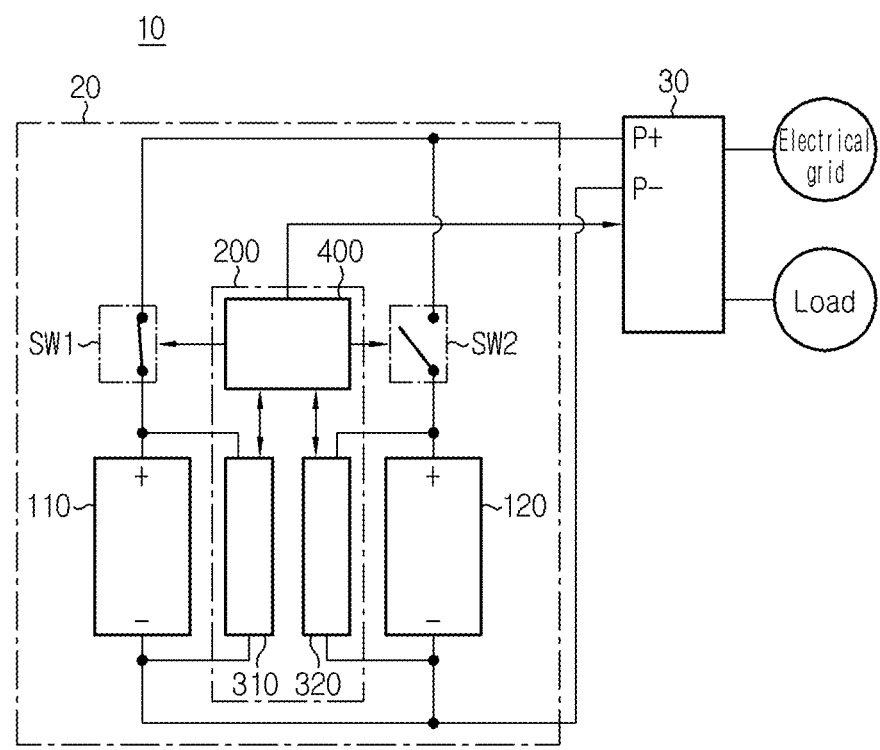

FIGS. 2 to 4 are diagrams for reference in describing operations that may be performed to connect the first battery pack 110 and the second battery pack 120 of FIG. 1 in parallel.

Hereinafter, it should be noted that the active operation performed by the control unit 200, for example, SOC calculation and comparison, SOH calculation, voltage data acquisition and comparison, current data acquisition and comparison, transmission or reception of various commands and switch control, is performed by the master controller 400 unless the context clearly indicates otherwise.

When the control unit 200 performs computation using the voltage or current, the corresponding voltage or current data is data that the first and second slave controllers 310, 320 periodically transmit to the master controller 400. The control logic executed by the control unit 200 may be stored as a program in the memory device provided in the master controller 400 and may be executed by the processor.

First, FIG. 2 shows situation at the time point when both the first switch SW1 and the second switch SW2 are turned off. Referring to FIG. 2, when the first switch SW1 is turned off, the first battery pack 110 is electrically separated from at least one of the first terminal P+ and the second terminal P−. And when the second switch SW2 is turned off, the second battery pack 120 is also electrically separated from at least one of the first terminal P+ and the second terminal P−. The control unit 200 measures each of the voltage of the first battery pack 110 and the voltage of the second battery pack 120 using the first and second slave controllers 310, 320, and calculates a voltage difference between the first battery pack 110 and the second battery pack 120. Subsequently, the control unit 200 compares the voltage difference between the first battery pack 110 and the second battery pack 120 with a first threshold voltage. The first threshold voltage may be preset such as, for example, 2.5V.

Alternatively, the control unit 200 may calculate the first threshold voltage based on the SOH of the first battery pack 110 and the SOH of the second battery pack 120. That is, the first threshold voltage is not preset, and instead, may change depending on the SOH of the first battery pack 110 and the SOH of the second battery pack 120. A lookup table in which the first threshold voltage may be looked up according to at least one of the SOH of the first battery pack 110 and the SOH of the second battery pack 120 may be stored in the memory device of the master controller 400 and may be referred to by the master controller 400.

The SOH may be a relative comparison value of the fully charged capacity at Middle Of Life (MOL) and the fully charged capacity at Beginning Of Life (BOL). The fully charged capacity at BOL may be calculated by integrating the current amount while the first and second battery packs 110, 120 are charged from the lower limit of discharge voltage to the upper limit of charge voltage. The control unit 200 may calculate the fully charged capacity at MOL using the current data of the first and second battery packs 110, 120 measured by the first and second slave controllers 310, 320 while the voltages of the first and second battery packs 110, 120 measured by the first and second slave controllers 310, 320 changes from the lower limit of discharge voltage to the upper limit of charge voltage. The control unit 200 may determine the fully charged capacity at BOL by referring to data pre-stored in the memory device. The control unit 200 may store the calculated SOH data in the memory device of the master controller 400.

FIG. 3 shows a situation at the time point when both the first switch SW1 and the second switch SW2 are turned on. When the voltage difference between the first battery pack 110 and the second battery pack 120 at the time point at which both the first switch SW1 and the second switch SW2 are turned off is less than the first threshold voltage, the control unit 200 turns on both the first switch SW1 and the second switch SW2. It is because the voltage difference between the first battery pack 110 and the second battery pack 120 of less than the first threshold voltage does not generate inrush current having a large magnitude enough to cause physical damage to the battery management apparatus 20.

FIG. 4 shows a situation at the time point when the first switch SW1 is turned on and the second switch SW2 is turned off. When the voltage of the second battery pack 120 at the time point at which both the first switch SW1 and the second switch SW2 are turned off is higher than the voltage of the first battery pack 110 by the first threshold voltage or more, the control unit 200 turns on the first switch SW1 connected in series to the first battery pack 110 while turning off the second switch SW2 connected in series to the second battery pack 120. Accordingly, the first battery pack 110 is electrically connected to and between the first terminal P+ and the second terminal P− through the first switch SW1 that has turned on, thus the first battery pack 110 is chargeable with the constant power supplied by the power conversion system 30. When an SOC difference between the first battery pack 110 and the second battery pack 120 at the time point at which the first switch SW1 is turned on and the second switch SW2 is turned off is equal to or larger than a threshold SOC, the control unit 200 transmits a first command to the power conversion system 30. On the contrary, when the SOC difference between the first battery pack 110 and the second battery pack 120 at the time point at which the first switch SW1 is turned on and the second switch SW2 is turned off is less than the threshold SOC, the control unit 200 transmits a second command to the power conversion system 30. The first command is for requesting the power conversion system 30 to supply the first constant power between the first terminal P+ and the second terminal P−. That is, the power conversion system 30 may supply the first constant power between the first terminal P+ and the second terminal P− in response to the first command. The second command is for requesting the power conversion system 30 to supply the second constant power that is lower than the first constant power between the first terminal P+ and the second terminal P−. That is, the power conversion system 30 may supply the second constant power between the first terminal P+ and the second terminal P− in response to the second command. For example, when the SOC of the first battery pack 110 is lower than the SOC of the second battery pack 120 by the threshold SOC or more, the first battery pack 110 is charged with the first constant power, and from the time point at which the sum of the SOC of the first battery pack 110 and the threshold SOC is equal to the SOC of the second battery pack 120, the first battery pack 110 is charged with the second constant power. The threshold SOC may be preset. Alternatively, the control unit 200 may calculate the threshold SOC based on the SOH of the first battery pack 110 and the SOH of the second battery pack 120. That is, the threshold SOC is not preset, and instead, may change depending on the SOH of the first battery pack 110 and the SOH of the second battery pack 120. To determine the threshold SOC from the SOH of the first and second battery packs 110, 120, a lookup table in which the threshold SOC may be looked up by the SOH of the first and second battery packs 110, 120 may be stored in the memory device of the master controller 400 and may be referred to by the master controller 400. The control unit 200 may periodically calculate the voltage difference between the first battery pack 110 and the second battery pack 120 while the first battery pack 110 is charged with the second constant power. When the voltage of the first battery pack 110 is lower than the voltage of the second battery pack 120 while the first battery pack 110 is charged with the second constant power, the control unit 200 may keep turning on the first switch SW1 and turning off the second switch SW2.

When the voltage of the first battery pack 110 is equal to or higher than the voltage of the second battery pack 120 and the voltage difference between the first battery pack 110 and the second battery pack 120 is smaller than a second threshold voltage while the first battery pack 110 is charged with the second constant power, the control unit 200 may turn on the second switch SW2 as shown in FIG. 3. Alternatively, when the voltage of the first battery pack 110 is equal to or higher than the voltage of the second battery pack 120 and the voltage difference between the first battery pack 110 and the second battery pack 120 is equal to the second threshold voltage while the first battery pack 110 is charged with the second constant power, the control unit 200 may turn on the second switch SW2 as shown in FIG. 3. The second threshold voltage corresponds to a voltage drop by the internal resistance and charge current of each of the battery packs 110, 120. The second threshold voltage may be preset to be equal to or higher or lower than the first threshold voltage. Alternatively, the control unit 400 may determine the second threshold voltage based on the SOH of any one battery pack 110 or 120 being charged with the second constant power. As the SOH of any one battery pack being charged with the second constant power is lower, the second threshold voltage determined by the control unit 400 may be higher. For example, when the SOH of any one battery pack being charged with the second constant power is 98%, the second threshold voltage may be determined as 3.0V, and when the SOH of any one battery pack being charged with the second constant power is 96%, the second threshold voltage may be determined as 3.3V. A lookup table in which the second threshold voltage may be looked up according to the SOH of any one battery pack being charged with the second constant power may be stored in the memory device of the master controller 400 and may be referred to by the master controller 400.

When the voltage of the first battery pack 110 is higher than the voltage of the second battery pack 120 by the second threshold voltage or more while the first battery pack 110 is charged with the second constant power, the control unit 200 may transmit a third command to the power conversion system 30 or stop transmitting the second command. That is, the third command may be outputted from the control unit 400 when the voltage difference between the first battery pack 110 and the second battery pack 120 is equal to or larger than the second threshold voltage while any one of the first battery pack 110 and the second battery pack 120 is charged with the second constant power. When the third command is transmitted from the control unit 200 or transmission of the second command is stopped while the second constant power is supplied, the power conversion system 30 may be configured to stop supplying the second constant power.

The control unit 200 may determine whether the voltage difference between the first battery pack 110 and the second battery pack 120 at the time point at which a preset stabilization period has passed from the time point at which the power conversion system 30 stopped supplying the second constant power is less than the first threshold voltage. The preset stabilization period is a period for removing polarization occurring while each battery pack is charged with the second constant power. When the voltage difference between the first battery pack 110 and the second battery pack 120 at the time point at which the stabilization period has passed is less than the first threshold voltage, the control unit 200 turns on the second switch SW2 as well. Accordingly, the first battery pack 110 and the second battery pack 120 are connected in parallel between the first terminal P+ and the second terminal P−. On the contrary, when the voltage difference between the first battery pack 110 and the second battery pack 120 at the time point at which the stabilization period has passed is equal to or larger than the first threshold voltage, the control unit 200 turns off the first switch SW1. Accordingly, both the first battery pack 110 and the second battery pack 120 are electrically separated from at least one of the first terminal P+ and the second terminal P−.

Figure 5:
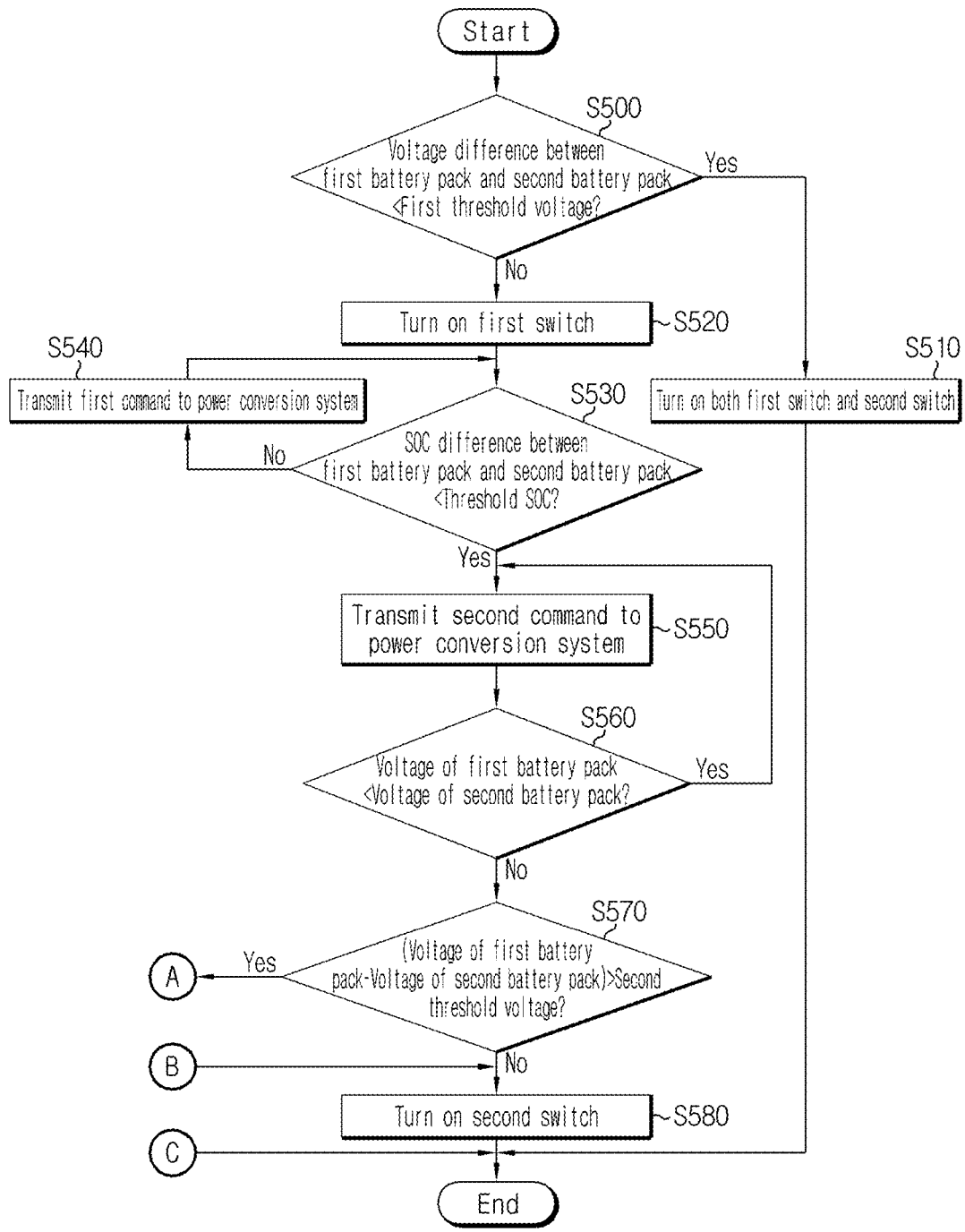
FIGS. 5 and 6 are flowcharts showing a method for connecting a first battery pack and a second battery pack in parallel according to another embodiment of the present disclosure.
Figure 6:
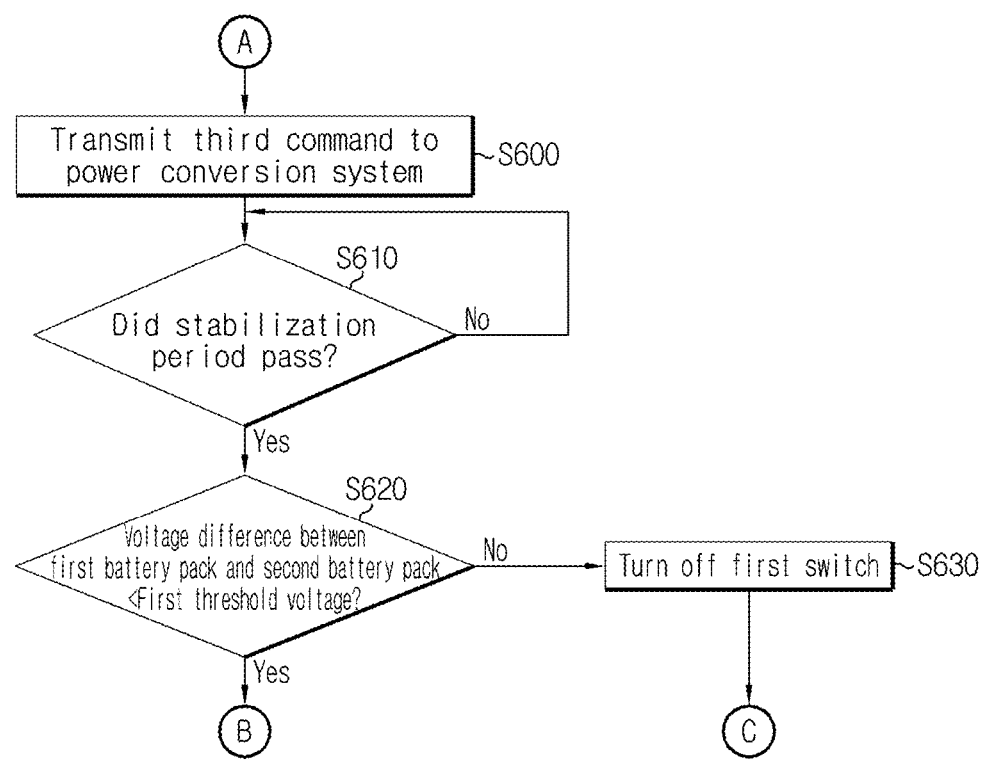

FIGS. 5 and 6 are flowcharts showing a method for connecting the first battery pack 110 and the second battery pack 120 in parallel according to another embodiment of the present disclosure. Each step of FIGS. 5 and 6 may be referred to as a 'balancing step'. The balancing steps as described below are for turning on the first switch SW1 and the second switch SW2 in a sequential order while charging any one of the first battery pack 110 and the second battery pack 120 to prevent the flow of inrush current when the first battery pack 110 and the second battery pack 120 are connected in parallel. The method shown in FIG. 5 starts when both the first switch SW1 and the second switch SW2 are turned off. For convenience of description, assume that the voltage of the first battery pack 110 is lower than the voltage of the second battery pack 120 at the time point at which the method shown in FIG. 5 starts.

Referring to FIGS. 1 to 6, in step S500, the control unit 200 determines whether a voltage difference between the first battery pack 110 and the second battery pack 120 is less than the first threshold voltage. In an example, when the voltage of the first battery pack 110 is 200V, the voltage of the second battery pack 120 is 202V and the first threshold voltage is 2.5V, a value of the step S500 is "Yes". In another example, when the voltage of the first battery pack 110 is 200V, the voltage of the second battery pack 120 is 205V and the first threshold voltage is 2.5V, a value of the step S500 is "No". When the value of the step S500 is "Yes", step S510 is performed. When the value of the step S500 is "No", step S520 is performed.

In step S510, the control unit 200 turns on both the first switch SW1 and the second switch SW2. This is for electrically connecting the first battery pack 110 and the second battery pack 120 in parallel.

In step S520, the control unit 200 turns on the first switch SW1. That is, when the voltage of the second battery pack 120 is higher than the voltage of the first battery pack 110 by the first threshold voltage or more, the first switch SW1 is turned on. In this instance, the second switch SW2 is maintained in a turn off state. Accordingly, the first battery pack 110 is chargeable with the power supplied between the first terminal P+ and the second terminal P−.

In step S530, the control unit 200 determines whether an SOC difference between the first battery pack 110 and the second battery pack 120 is less than the threshold SOC. In an example, when the SOC of the first battery pack 110 is 66%, the SOC of the second battery pack 120 is 75% and the threshold SOC is 8%, the SOC difference is 9%, and thus a value of the step S530 is "No". In another example, when the SOC of the first battery pack 110 is 70%, the SOC of the second battery pack 120 is 75% and the threshold SOC is 8%, the SOC difference is 5%, and thus a value of the step S530 is "Yes". When the value of the step S530 is "No", step S540 is performed. When the value of the step 530 is "Yes", step S550 is performed.

In step S540, the control unit 200 transmits a first command to the power conversion system 30. The power conversion system 30 supplies the first constant power between the first terminal P+ and the second terminal P− in response to the first command. Accordingly, the first battery pack 110 may be charged with the first constant power. The first constant power may correspond to a first ratio of a preset maximum power. The first ratio may be larger than 0 and smaller than 1. For example, when the maximum power is 1000 W and the first ratio is 0.5, the first constant power is 500 W. When the voltage of the first battery pack 110 at a certain time point at which the first constant power of 500 W is supplied is 300V, as the charge current of 5/3 A flows in the first battery pack 110, the first battery pack 110 may be charged.

In step S550, the control unit 200 transmits a second command to the power conversion system 30. The power conversion system 30 supplies the second constant power between the first terminal P+ and the second terminal P− in response to the second command. Accordingly, the first battery pack 110 may be charged with the second constant power. The second constant power may correspond to a second ratio of the preset maximum power. The second ratio may be larger than 0 and smaller than 1. Additionally, the second ratio may be smaller than the first ratio. For example, when the maximum power is 1000 W and the second ratio is 0.1 that is smaller than the first ratio, the second constant power is 100 W. When the voltage of the first battery pack 110 at a certain time point at which the second constant power of 100 W is supplied is 300V, as the charge current of ⅓ A flows in the first battery pack 110, the first battery pack 110 may be charged. Accordingly, those skilled in the art will easily understand that when the second constant power is supplied, the first battery pack 110 will be charged more slowly than when the first constant power is supplied, and a voltage drop resulting from the charge current will reduce.

In step S560, the control unit 200 determines whether the voltage of the first battery pack 110 is lower than the voltage of the second battery pack 120. When a value of the step S560 is "Yes", step S550 is performed. When the value of the step S560 is "No", step S570 is performed.

In step S570, the control unit 200 determines whether a voltage difference between the first battery pack 110 and the second battery pack 120 is larger than the second threshold voltage. When a value of the step S570 is "No", step S580 is performed. When the value of the step S570 is "Yes", step S600 is performed.

In step S580, the control unit 200 turns on the second switch SW2. As the first switch SW1 has been already turned on from the step S520, the first battery pack 110 and the second battery pack 120 are connected in parallel between the first terminal P+ and the second terminal P− from the time point at which the second switch SW2 is also turned on by the step S580.

In step S600, the control unit 200 transmits a third command to the power conversion system 30. The power conversion system stops supplying the second constant power in response to the third command. "Yes" as the value of the step S570 indicates that the voltage of the first battery pack 110 increased so much fast compared to the period during which the second constant power was supplied. It is a situation in which actually, the voltage of the first battery pack 110 sharply increased, or it is highly likely that the voltage of the first battery pack 110 was measured incorrectly. Accordingly, the control unit 200 may transmit the third command to temporarily stop charging the first battery pack 110.

In step S610, the control unit 200 determines whether the stabilization period has passed from the time point at which the third command was transmitted. During the stabilization period, the voltage of the first battery pack 110 gradually reduces toward the open circuit voltage corresponding to the SOC of the first battery pack 110. When a value of the step S610 is "Yes", step S620 is performed.

In step S620, the control unit 200 determines whether the voltage difference between the first battery pack 110 and the second battery pack 120 is less than the first threshold voltage. When a value of the step S620 is "Yes", step S580 is performed. When the value of the step S620 is "No", step S630 is performed.

In step S630, the control unit 200 turns off the first switch SW1. Accordingly, the first battery pack 110 is also electrically separated from at least one of the first terminal P+ and the second terminal P−. The step S500 may be automatically performed again after the time point at which the step S630 was performed.

Figure 7:
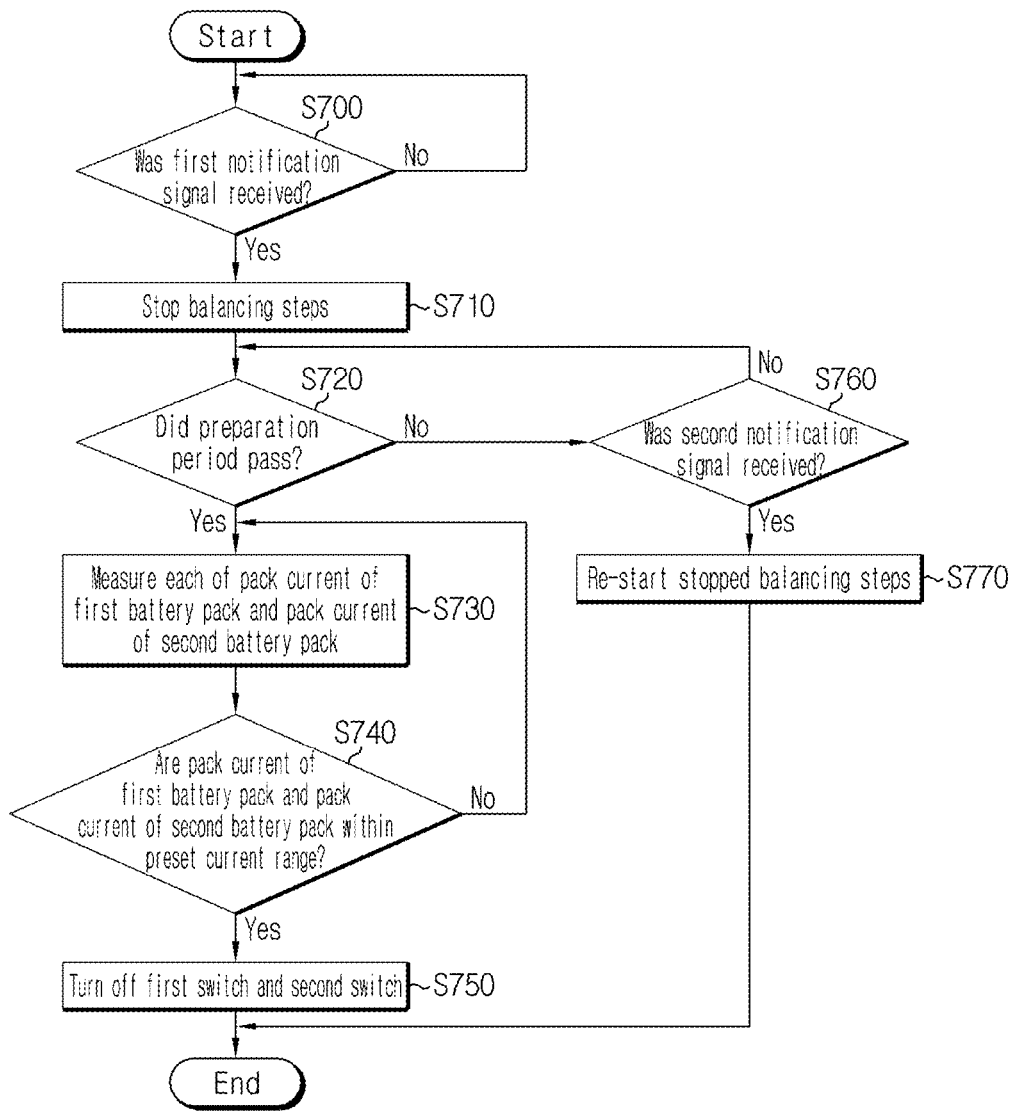
FIG. 7 is a flowchart showing a method for protecting a battery management apparatus according to still another embodiment of the present disclosure.

FIG. 7 is a flowchart showing a method for protecting the battery management apparatus 20 according to still another embodiment of the present disclosure. The method of FIG. 7 may start while any one of the balancing steps of FIGS. 5 and 6 is performed.

Referring to FIGS. 1 to 7, in step S700, the control unit 200 determines whether a first notification signal was received from the power conversion system 30. That is, the control unit 200 may periodically monitor whether the first notification signal is received. The first notification signal may indicate that the power supply from the electrical grid electrically connected to the power conversion system 30 was interrupted due to power outrage. For reference, after transmitting the first notification signal to the control unit 200, the power conversion system 30 may start reducing the power supplied between the first terminal and the second terminal down to 0 W (watt). When a value of the step S700 is "Yes", step S710 is performed.

In step S710, the control unit 200 stops the balancing steps in response to the first notification signal. For example, the control unit 200 stops any one (for example, S530, S560, S580 or S610) of the steps S500-S630 of FIGS. 5 and 6 being performed at the time point at which the first notification signal was received by the control unit 200. The control unit 200 may store data capable of identifying the stopped balancing step in its memory device.

In step S720, the control unit 200 determines whether a preset preparation period has passed from the time point at which the first notification signal was received. The preparation period is equal to or longer than a tracking period of the power conversion system 30. For example, the preparation period may be twice longer than the tracking period. The tracking period indicates a minimum time required for the power conversion system 30 to reduce the power supplied between the first terminal P+ and the second terminal P− down to 0 W. When a value of the step S720 is "Yes", step S730 is performed. When the value of the step S720 is "No", step S760 is performed.

In step S730, the control unit 200 measures each of the pack current of the first battery pack 110 and the pack current of the second battery pack 120 using the first and second slave controllers 310, 320 in the shutdown preparation mode by executing the shutdown preparation mode. That is, the shutdown preparation mode is a mode for measuring the pack current of the first battery pack 110 and the pack current of the second battery pack 120 and determining whether each pack current is within a preset current range, and may be executed at the time point at which the preset preparation period has passed from the time point at which the first notification signal was received.

In step S740, the control unit 200 determines whether the pack current of the first battery pack 110 and the pack current of the second battery pack 120 are within the preset current range. The preset current range may be, for example −1.5~+1.5 A. The pack current of the first battery pack 110 within the current range indicates a state in which as the power control system normally operates (that is, supply power reduces to 0 W within the standby period), even though the first switch SW1 is turned off, the first switch SW1 is not damaged. The pack current of the second battery pack 120 within the current range indicates a state in which as the power control system normally operates, even though the second switch SW2 is turned off, the second switch SW2 is not damaged. A value of the step S740, "No", indicates that at least one of the pack current of the first battery pack 110 and the pack current of the second battery pack 120 is outside of the preset current range. When the value of the step S740 is "Yes", step S750 is performed. When the value of the step S740 is "No", the control unit 200 executes a current diagnosis mode to return to the step S730. That is, the current diagnosis mode is a mode for monitoring the pack current of the first battery pack 110 and the pack current of the second battery pack 120 for an indefinite time until the pack current of the first battery pack 110 and the pack current of the second battery pack 120 are within the preset current range.

In step S750, the control unit 200 turns off the first switch SW1 and the second switch SW2. When any one of the first switch SW1 and the second switch SW2 is already turned off, the control unit 200 may only turn off the other.

In step S760, the control unit 200 determines whether a second notification signal is received from the power conversion system 30. The second notification signal may be received, for example, while the step S710 or S720 is performed. The second notification signal may indicate that the power supply from the electrical grid resumed by power restoration. When a value of the step S760 is "Yes", step S770 is performed. When the value of the step S760 is "No", the method returns to step S720.

Meanwhile, in case that the first switch SW1 and the second switch SW2 have been already turned on at the time point at which the first notification signal was received, when the second notification signal is received from the power conversion system 30 during execution of the current diagnosis mode, the control unit 200 may maintain the first switch SW1 and the second switch SW2 in the turn on state.

In step S770, the control unit 200 resumes the balancing step stopped in the step S710. The second notification signal may indicate that the power supply from the electrical grid resumed by power restoration. For example, when the balancing step S530 is stopped by the first notification signal in the step S700, the control unit 200 may identify that the step S530 is in the stopped state based on data stored in the memory device, and resume the balancing step S530 in the step S770.

The embodiments of the present disclosure described hereinabove are not implemented only through the apparatus and method, and may be implemented through programs that perform functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

DESCRIPTION OF REFERENCE NUMERALS

10: Energy storage system
20: Battery management apparatus
30: Power conversion system
110: First battery pack
120: Second battery pack
SW1: First switch
SW2: Second switch
200: Control unit
310: First slave controller
320: Second slave controller
400: Master controller

What is claimed is:

1. A battery management apparatus connectable to a power conversion system through a first terminal and a second terminal of the power conversion system, the battery management apparatus comprising:
a first battery pack;
a second battery pack;
a first switch connected to the first battery pack between the first terminal and the second terminal;
a second switch connected to the second battery pack between the first terminal and the second terminal; and
a control unit configured to:
determine whether a pack current of the first battery pack and a pack current of the second battery pack are within a preset current range in a shutdown preparation mode in response to a first notification signal from the power conversion system, while any one of balancing steps for parallel connection between the first battery pack and the second battery pack is performed; and turn off the first switch and the second switch when the pack current of the first battery pack and the pack current of the second battery pack are determined to be within the preset current range, wherein the balancing steps, performed by the control unit, comprise:

determining whether a voltage difference between the first battery pack and the second battery pack is less than a first threshold voltage, when the voltage difference is less than the first threshold voltage, turning on both the first switch and the second switch to connect the first battery pack and the second battery pack in parallel, and when the voltage difference is greater than or equal to the first threshold voltage:

turning on the first switch and maintaining the second switch in a turn off state, and determining whether a state of charge (SOC) difference between the first battery pack and the second battery pack is less than a threshold SOC.

2. The battery management apparatus according to claim 1, wherein the control unit is further configured to execute the shutdown preparation mode at a time point at which a preset preparation period has passed from a time point at which the first notification signal was received by the control unit.

3. The battery management apparatus according to claim 2, wherein:

the preset preparation period is equal to or longer than a tracking period of the power conversion system; and the tracking period indicates a minimum time required for the power conversion system to reduce power supplied between the first terminal and the second terminal down to 0 W.

4. The battery management apparatus according to claim 2, wherein the control unit is further configured to resume one of the balancing steps being performed at the time point at which the first notification signal was received, when a second notification signal from the power conversion system is received before the preset preparation period has passed from the time point at which the first notification signal was received.

5. The battery management apparatus according to claim 1, wherein the control unit is further configured to execute a current diagnosis mode for monitoring each of the pack current of the first battery pack and the pack current of the second battery pack for an indefinite time, when at least one of the pack current of the first battery pack and the pack current of the second battery pack at a time point at which the shutdown preparation mode was executed is determined to be outside of the preset current range.

6. The battery management apparatus according to claim 5, wherein the control unit is further configured to turn off the first switch and the second switch, when the pack current of the first battery pack and the pack current of the second battery pack are within the preset current range during execution of the current diagnosis mode.

7. The battery management apparatus according to claim 5, wherein the control unit is further configured to maintain the first switch and the second switch in a turn on state when a second notification signal from the power conversion system is received during execution of the current diagnosis mode, when the first switch and the second switch were already turned on at the time point at which the first notification signal was received by the control unit.

8. The battery management apparatus according to claim 1, wherein the first notification signal indicates that power supply from an electrical grid electrically connected to the power conversion system was interrupted.

9. The battery management apparatus according to claim 4, wherein the second notification signal indicates that power supply from the electrical grid is resumed.

10. An energy storage system, comprising:

the battery management apparatus according to claim 1, wherein the power conversion system is connectable to the battery management apparatus through the first terminal and the second terminal.

11. A battery management method for protecting the battery management apparatus according to claim 1, the battery management method comprising:

executing the shutdown preparation mode in response to the first notification signal from the power conversion system, while any one of the balancing steps for parallel connection between the first battery pack and the second battery pack is performed;

determining whether the pack current of the first battery pack and the pack current of the second battery pack are within the preset current range in the shutdown preparation mode; and turning off the first switch and the second switch when the pack current of the first battery pack and the pack current of the second battery pack are determined to be within the preset current range.

12. The battery management apparatus according to claim 1, wherein the balancing steps further comprise:

when the SOC difference is greater than or equal to the threshold SOC:

transmitting a first command to the power conversion system to control the power conversion system to supply a first constant power between the first terminal and the second terminal; and repeating the determining whether the SOC difference between the first battery pack and the second battery pack is less than the threshold SOC;

when the SOC difference is less than the threshold SOC:

transmitting a second command to the power conversion system to control the power conversion system to supply a second constant power between the first terminal and the second terminal, the second constant power being less than the first constant power;

determining whether the voltage of the first battery pack is lower than the voltage of the second battery pack;

when the voltage of the first battery pack is lower than the voltage of the second battery pack, repeating the transmitting the second command to the power conversion system;

when the voltage of the first battery pack is greater than or equal to the voltage of the second battery pack, determining whether the voltage difference between the first battery pack and the second battery pack is larger than a second threshold voltage; and when the voltagee difference is less than or equal to the second threshold voltage, turning on the second switch such that the first battery pack and the second battery pack are connected in parallel between the first terminal and the second terminal.

13. The battery management apparatus according to claim 12, wherein the balancing steps further comprise, when the voltage difference is larger than the second threshold voltage:

transmitting a third command to the power conversion system to control the power conversion system to stop supplying the second constant power;

determining whether a stabilization period has passed from a time point at which the third command was transmitted, the stabilization period including the voltage of the first battery pack gradually reducing toward an open circuit voltage corresponding to the SOC of the first battery pack;

when it is determined that the stabilization period has passed, determining whether the voltage difference between the first battery pack and the second battery pack is less than the first threshold voltage;

when it is determined that the voltage difference is less than the first threshold voltage, turning on the second switch such that the first battery pack and the second battery pack are connected in parallel between the first terminal and the second terminal; and when it is determined that the voltage difference is greater than or equal to the first threshold voltage, turning off the first switch such that the first battery pack is electrically separated from at least one of the first terminal and the second terminal.

* * * * *